Patented May 13, 1947

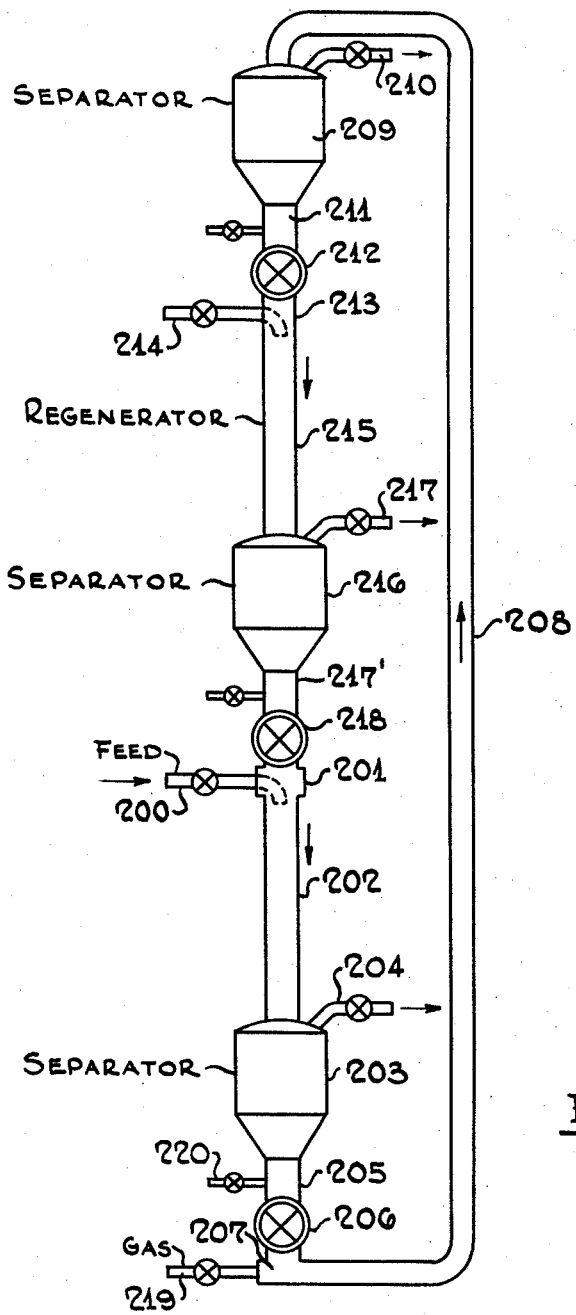

2,420,558

UNITED STATES PATENT OFFICE 2,420,558

CATALYTIC CONVERSION OF HYDROCARBONS

John C. Munday, Cranford, N. J., assignor to Standard Oil Development Company, a corporation of Delaware Application July 20, 1944, Serial No. 545,813

2 Claims. (Cl. 196—52)

This invention relates to a process for the catalytic conversion of hydrocarbons, and more particularly relates to a process for the catalytic conversion of hydrocarbons using a powdered catalyst.

The use of powdered catalysts for the carrying out of various chemical reactions, such as the conversion of hydrocarbons, is a well-known operation. In such a process the catalyst is usually conveyed through the system by means of gases or vapors. The catalyst is in a very finely-divided form, generally between 200 and 400 mesh, although coarser or finer fractions may be included therewith. According to this process, the material to be converted is contacted with the catalyst in the powdered form in a reaction zone under such conditions that conversion is accomplished. In general, the flow of catalyst and material to be converted is either concurrently upward or countercurrently through the reaction zone. The catalyst is then separated from the reaction products and passed to a regenerator where it is contacted with an oxygen-containing gas to remove carbon and other materials which cause deactivation of the catalyst. In both the reaction and regeneration zones the flow of vapors or gases are so controlled that the mixture of catalyst and gases or vapors forms two separate phases, a lower dense-phase having a level similar to that of a violently boiling liquid, and an upper less dense-phase in which the catalyst is merely suspended in the gases or vapors. These two phases behave in a manner quite distinct from each other. The lower dense-phase exhibits the properties of fluid flow, pseudohydrostatic pressure and the like, the catalyst and gases acting together as a single mass which simulates a liquid. The upper or less dense-phase mass does not exhibit such properties, the solid is merely suspended in the gases or vapors and behaves in no way like a liquid. This distinction between these two phases is very important in powdered catalyst operations since advantage is taken of the fluid-like properties of the dense-phase to transport the catalyst through the system. This advantageous property of the dense-phase mass is generally utilized by employing a standpipe in connection with the lower portion of either the reaction zone or the regeneration zone, or both, to transport the catalyst as a dense-phase mass from one to the other, this standpipe having a height sufficient to provide a pressure head which will overcome pressure drops encountered during transfer and prevent blowback of gases and vapors from the reaction zone to the regeneration zone and vice versa. In order to assure that the catalyst mass in the standpipe at all times exhibits the characteristic of fluid flow, a fluidizing gas is often added at various points along the standpipe. Such systems in which solids are handled in the finely divided fluidized state are called "fluid" processes.

In all of the cases described above, the reaction products have been removed overhead from the reactor and the regeneration gases have been removed overhead from the regenerator. By proper consideration of gas velocities upward through the reactor and/or the regenerator, the catalyst residence time may easily be made materially longer than that of the vapors or gases, and, in fact, due to slippage of the gas past the catalyst particles, it is difficult to operate otherwise in upflow systems except at very high velocities whereat erosion problems become very serious. In many cases, however, it is desirable to conduct a reaction in the presence of a catalyst in such a manner as to have the catalyst in use for only a short interval of time prior to regeneration or heating or cooling or the like, for example, when it is desirable that the reactant contact a very large amount of catalyst and/or that it contact only catalyst of a high degree of catalytic efficiency. With conventional fluid catalytic processes the reverse situation is frequently true; that is, the catalyst is held in the reaction vessel for a matter of minutes or hours at a relatively low catalyst/reactant ratio, rather than seconds at a high catalyst/reactant ratio as is frequently desirable. Among the reactions for which long catalyst residence time may be detrimental from the standpoint of obtaining high yields of desired product are catalytic dehydrogenation of butane or butene, aromatization of naphthas, hydroforming of naphthas, the production of oil from carbon monoxide and hydrogen, catalytic cracking, coking of residuals, etc. In some cases, as in reactions in which the solid particles themselves enter into the reaction by virtue of chemical or physical phenomena attributable to the nature of the gas and solid, the holding of the solid in the reaction zone for too long a time merely results in poor utilization of reaction space and in some cases may cause the reaction to proceed too far. Similar principles apply when the solid is used as an adsorbent in gas purification. A particularly good illustration is a process for dehydrogenating a petroleum gas at low partial pressure and very short contact time, i. e., less than a second, employing a high catalyst/gas ratio in order that the endothermic reaction heat may be supplied by hot catalyst. In the conventional fluid catalytic process a fluidized catalyst bed only several inches in thickness and 40 or 50 feet in diameter may be required in order to give proper contact time and capacity, and the difficulties of distributing catalyst evenly to such a bed at a very high rate are enormous. On the other hand, the reaction conditions are easily met in the process of the present invention.

It is therefore the main object of the present invention to provide a fluid catalyst process in which high catalyst concentrations and high circulation rates and short contact times are provided.

Other objects and a fuller understanding of this invention may be had by referring to the following description and claims taken in conjunction with the accompanying drawings in which:

Figure 3 illustrates an arrangement in which both the reactor and the regenerator comprise superimposed standpipes through which the catalyst and feed stock, and regeneration gases flow concurrently downward.

Figure 1:
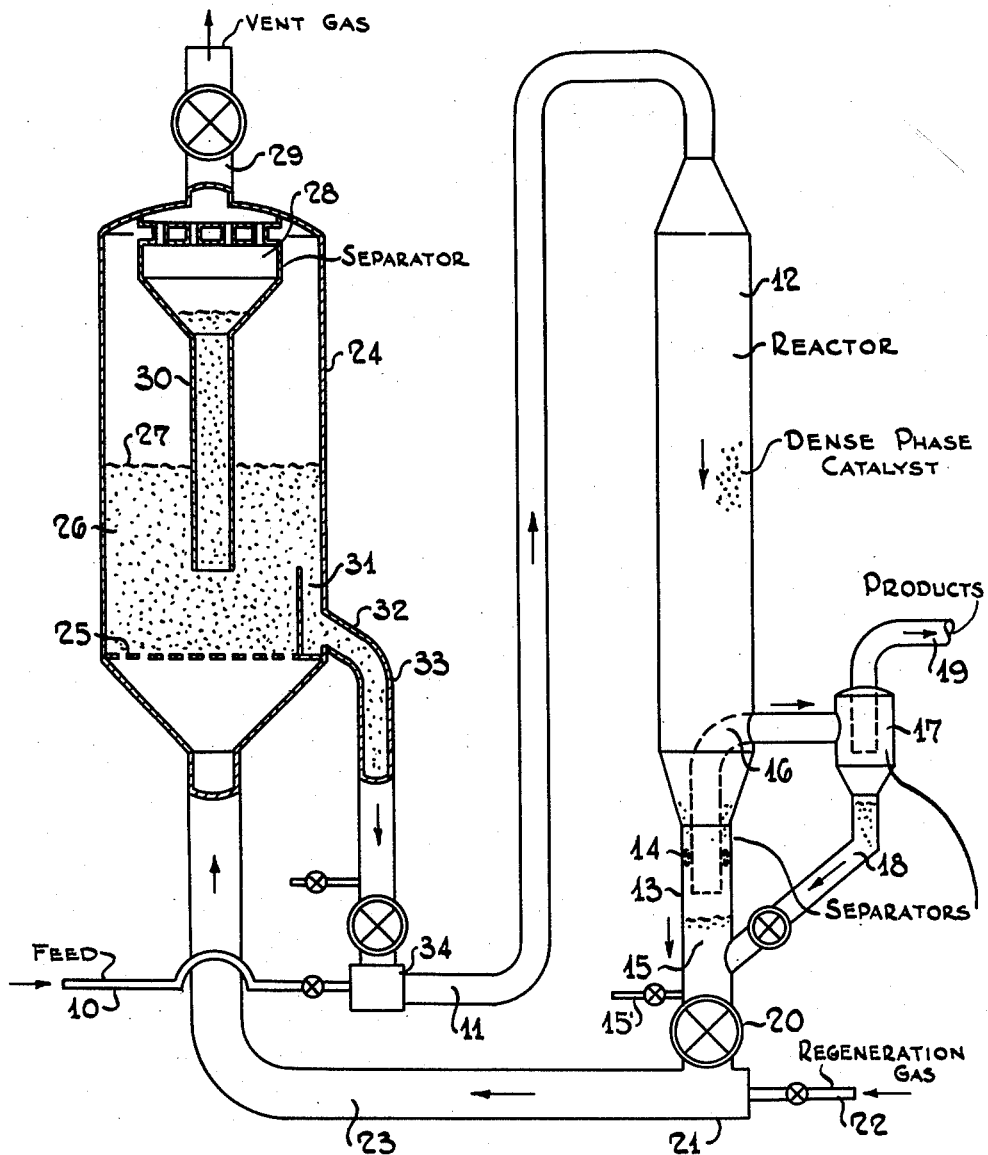
Figure 1 illustrates one embodiment of this invention in which the catalytic conversion is carried out in a reactor through which the mixture of catalyst and vaporized feed flow concurrently downward.

Referring now to Figure 1, a preheated feed stock, such as gas oil, is introduced into dispersion chamber 34 into which hot catalyst from standpipe 33 is introduced. Upon contacting the hot catalyst, which is at a temperature of between 1,000 and 1,200° F., the gas oil is immediately vaporized and is passed along with the catalyst as a dense-phase mass through line 11 into the top of reactor 12. In this reactor the catalyst and oil vapors pass at a temperature of about 975° F. downwardly through the reactor as a dense-phase mass. The velocity of the gas oil vapors flowing through line 11 should be sufficient to produce a catalyst density in reactor 12 of between about 10 and about 35 lbs. per cu. ft. of catalyst having a freely settled density of about 45 lbs. per cu. ft. The contact time in reactor 12, although relatively short, is of sufficient duration to allow the gas oil vapors to be catalytically converted by the time the mixture of catalyst and vapors has reached the lower portion of reactor 12. Spent catalyst and reacted vapors are withdrawn from the lower portion of reactor 12 through line 13 and are immediately separated. Thus, line 13 contains vanes 14 adapted to give a whirling separating motion to the catalyst-oil-vapor mixture passing through line 13. The catalyst settles into a settling zone 15 in the lower portion of line 13 and vapors containing a small portion of catalyst particles are withdrawn through line 16 and passed into a secondary cyclone separator 17 where the remainder of the catalyst particles are separated from the reaction products and returned to the settling zone 15 through line 18. Reaction products are withdrawn through line 19. Spent catalyst is removed from settling zone 15 through valve 20 into dispersion zone 21, where it is mixed with the regeneration gas, such as air, introduced through line 22. If desired a stripping gas may be introduced through to line 15 to strip adsorbed vapors from the catalyst particles and maintain the catalyst into a fluidized condition. The dispersion of the regeneration gas and powdered catalyst formed in dispersion chamber 21 must be under a pressure at least sufficient to overcome the pressure drop through the regenerating circuit or at least through certain stages of the regenerating circuit. It is therefore necessary to impose the desired pressure on the powdered material being introduced into the dispersion zone 21. This can be accomplished, for example, by constructing the conduit 13 and settling chamber 15 in the form of a vertical standpipe in which the spent catalytic material is maintained in a freely flowing state. In such case a pressure is developed at the bottom of the standpipe and the height of the dense-phase catalyst in the standpipe and reactor can be regulated so as to provide sufficient pressure at the bottom thereof to feed the powdered material into the dispersion chamber 21. In order to maintain the spent catalyst in a freely flowing state in the vertical standpipe 13, a fluidizing gas may be introduced into line 13 at one or more points if desired. This gas may be inert gas, steam, nitrogen, carbon dioxide, or the like, or it may be a gas capable of having a modifying effect on the catalyst.

The mixture of regenerating gas and powdered catalyst to be regenerated passes from the dispersion zone 21 through line 23 into the bottom portion of regenerator 24 through distribution grid 25, wherein the mixture is maintained for a period sufficient to regenerate the powdered material.

Velocity of the regenerating gas may be sufficiently high so that the regenerator residence times of the powder and the gas are of the same order of magnitude. It may be preferred, for example, when a considerable amount of carbon must be burned from the catalyst, to design the regenerator with a relatively great cross sectional area, to pass the regenerating gas at a relatively low velocity, and to control catalyst withdrawal so that the time of residence of the catalyst within the regenerator 24 is materially longer than the time required for the passage of the regenerating gas therethrough. The velocity employed obviously depends on the particle size of the solid and on its density, but in general superficial upward linear velocities between 1 and 10 ft. per second are suitable, and result in the formation of two phases within the regeneration zone 24, a dense-phase mass 26 having a level 27 similar to a boiling liquid. Above this dense-phase mass is a phase in which catalyst is suspended in regeneration gas which is being withdrawn through separator 28 and line 29. In separator 28 all suspended particles of catalyst are removed from the spent regeneration gases and returned to the dense-phase mass 26 through line 30.

Regenerated catalyst collects in well 31 and is withdrawn through line 32 and introduced into standpipe 33 which should be of sufficient height to develop a pressure at the bottom thereof sufficient to feed the powdered material into dispersion chamber 34.

Figure 2:
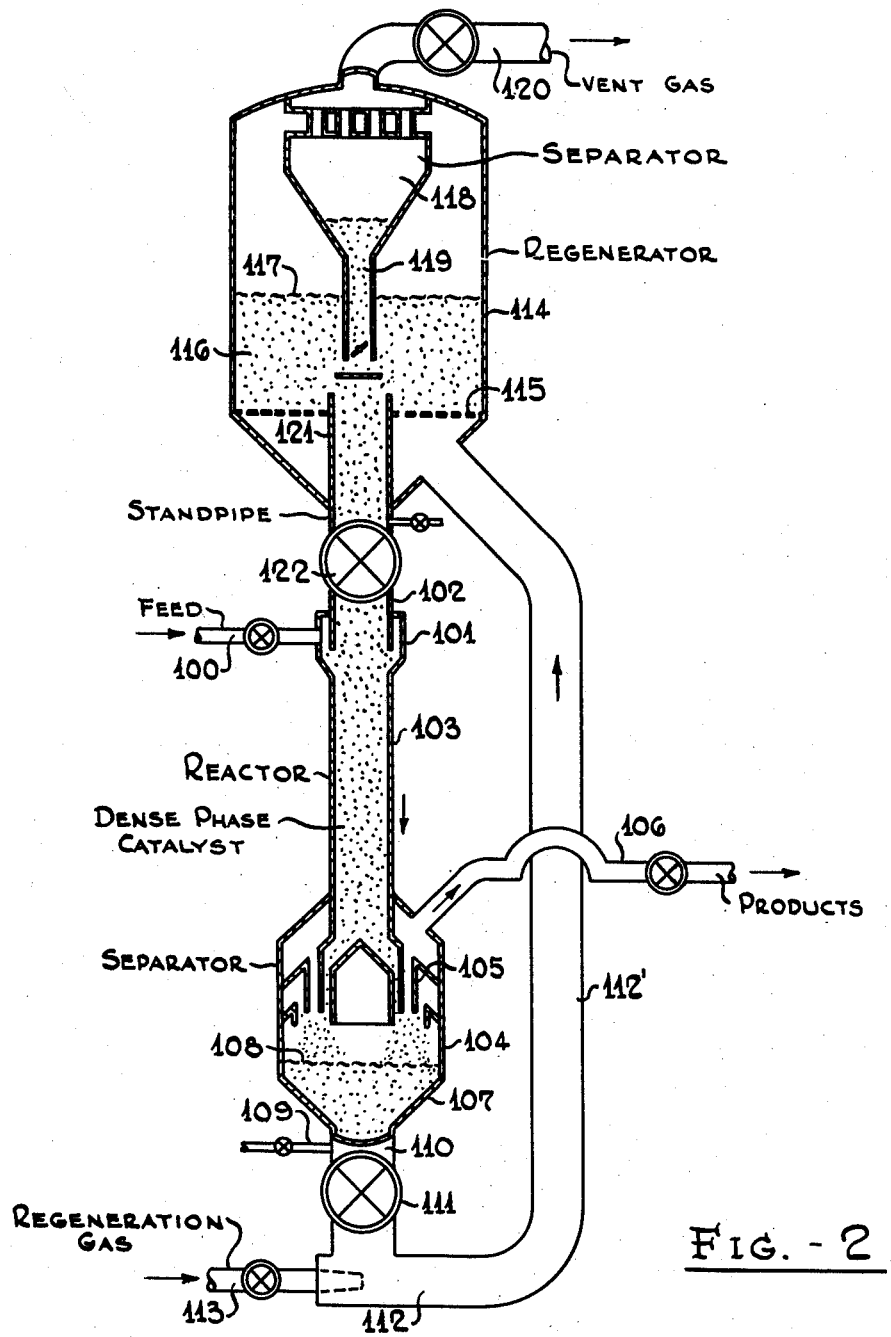
Figure 2 illustrates an arrangement similar to Figure 1 in which the catalytic converter is a standpipe which receives the catalyst by gravity flow from the regenerator.

Referring now to Figure 2, there is illustrated a slightly different relative arrangement of the regenerator and the reactor than is illustrated in Figure 1. In this embodiment the reactor comprises a standpipe adapted to receive regenerated catalyst from the bottom of the regenerator by gravity flow.

Referring more particularly to Figure 2, a naphtha which may be virgin or cracked stock is introduced through feed line 100 into dispersion chamber 101, where it contacts hot aromatization catalyst having a temperature between 1,050 and 1,200 F., issuing from the bottom of standpipe 102. Upon contacting the hot catalyst, the naphtha is immediately vaporized and forms a dense-phase fluidized mass of solid particles with the catalyst and flows concurrently therewith down through reactor 103. The density of this fluidized mass of catalyst should be maintained between about 15 and about 35 lbs. per cu. ft., when employing a catalyst having a freely settled density of about 40-50 lbs. per cu. ft. Lower or higher fluid densities may be employed when lighter catalysts such as those containing large percentages of light inert bases such as kieselguhr, or heavier catalysts containing large percentages of catalytic metals or metal oxides, are employed. The contact time of the catalyst and vapors within reactor 103, though relatively short, is sufficiently long for 40-90 percent of the naphtha to be converted into aromatics. The dense-phase mass of product vapors and spent catalyst passes from reactor 103 into the top of separator 104 which may be of the multiclone type wherein a whirling motion is given to the mixture so that solid particles are separated from the vapors. Vapors substantially free of solid catalyst are passed upwardly through multiclone tubes 105 and are withdrawn through line 106, while spent catalyst settles as a dense-phase mass 107 having a level 108 in the bottom portion of separator 104. This mass may be kept in a fluidized condition by the introduction of a fluidizing and stripping gas through line 109. The spent catalyst separated from the products passes from the bottom of separator 104 through standpipe 110 provided with control valve 111 into a dispersion chamber 112, where it is mixed with a regeneration gas introduced through line 113. Such gas may be air or air diluted with other gas when catalysts such as alumina-chromia or alumina-molybdia or molybdia on spinel-type bases are employed.

The dispersion of regeneration gas and powder formed in chamber 112 must be under a pressure at least sufficient to overcome the pressure drop on passage of the gas through the system. It is therefore necessary, as described above in connection with standpipe 13 in Figure 1, that the pressure developed in standpipe 110 be regulated so as to provide sufficient pressure at the bottom thereof to feed the powdered material into dispersion chamber 112. The mixture of regeneration gas and powdered catalyst to be regenerated passes from dispersion chamber 112 through line 112' into the bottom portion of regenerator 114 through distribution grid 115, where the mixture is maintained for a period sufficient to regenerate the powdered material. Regenerator 114 is similar to regenerator 24 in Figure 1 and is provided with a dense-phase mass 116 at a level 117. Spent regeneration gas containing catalyst particles are removed through separator 118 where the catalyst particles are separated and returned to the dense-phase mass 116 through line 119. Spent regeneration gas is removed through line 120. Regenerated catalyst collects in well 121, which may extend above the top of grid 115, as shown, and is withdrawn from the bottom of regenerator 114 through valve 122 and introduced into the top of dispersion chamber 101 through line 102, where it is mixed with fresh feed, as described above.

Referring more particularly now to Figure 3, there is illustrated a third embodiment of this invention in which the regenerator is mounted on top of the reactor and in which the flow of catalyst and vapors or gases are concurrently downward through each. By arranging one zone above the other as illustrated in Figures 2 and 3, the catalyst is circulated through the system with a minimum of expenditure of energy and a minimum of resistance to flow.

Accordingly, a fresh feed such as n-butene is introduced through line 200 into dispersion chamber 201, where it contacts a hot regenerated dehydrogenation catalyst at a temperature between about 1,200 and 1,325° F. The butene is preferably diluted with 5-10 volumes of an inert gas, suitably steam if a steam stable catalyst is employed. The mixture of hot regenerated catalyst and butene vapors at a temperature of about 1,200–1,275° F. pass concurrently downward through reactor 202 and are introduced into the top of separator 203, where reaction product vapors and spent catalyst are separated. Reaction products including butadiene and hydrogen are withdrawn through line 204 and spent catalyst is withdrawn from the bottom of the separator through standpipe 205 as a dense-phase fluidized mass. Spent catalyst is introduced through control valve 206 into dispersion chamber 207, where it is contacted with conveying gas from line 219 and passed upwardly through line 208 into the top of separator 209 where the gas is separated from the spent catalyst and is removed from the separator 209 through line 210. The conveying gas also serves to strip adsorbed vapors from the catalyst. If desired a stripping and fluidizing gas may be introduced through line 220. Spent catalyst collects as a dense-phase fluidized mass in the bottom portion of separator 209 and is withdrawn from the bottom thereof through line 211 and control valve 212 into dispersion chamber 213, where it is contacted with regeneration gas introduced through line 214. The mixture of regeneration gas and spent catalyst is passed concurrently downward through regenerator 215. Concurrent regeneration of this type is particularly adapted to hydrocarbon conversions characterized by low carbon formation and to other conversions wherein catalyst deactivation is relatively slight. The contact time within this regenerator, although short, is therefore sufficiently long to enable the catalyst to be regenerated. The density of the dense-phase mass of catalyst and regeneration gas flowing through regeneration zone 215 is between 15 and 50 lbs. per cu. ft., based on a catalyst having a freely settled density of 65 lbs. per cu. ft. or between 10 and 25 lbs. per cu. ft. when employing relatively light catalyst such as a steam-regenerable $MgO$—$Fe_2O_3$—$CuO$—$K_2O$ catalyst having a freely settled density of about 30 lbs. per cu. ft. Regenerated catalyst and spent regeneration gas is removed from the bottom of regenerator 215 into the top of separator 216 where spent regeneration gas is separated from regenerated catalyst and removed through line 217. Regenerated catalyst collects in the bottom of separator 216 as a dense-phase mass and is removed therefrom through standpipe 217' and control valve 218, through which it is introduced into dispersion chamber 201 for contacting fresh feed. In general the density of the dense-phase reaction mixture employed should be between 0.25 and 0.75 of the density of the solid in the freely-settled state, as at higher densities fluidity difficulties may arise, while at lower densities the mixture takes on the aspects of simple suspensions. The latter must be avoided in downflow vessels if good distribution of solid and gas is to be obtained, an especially vicious phenomena being encountered wherein the solid plates out on the wall and flows along the wall until the stream has been turned in an upward direction. Such difficulties are minor or entirely absent when dense-phase mixtures are employed.

Although it is preferred that the solids employed in carrying out the invention have a particle size range of about 200–400 mesh, finer or coarser or broader ranges may be employed. However, it will be understood that as the fineness is increased so will the difficulty of separation from gases increase, and that if the coarseness is increased so as to be substantially in the granular range, i. e., larger than 50 or 100 mesh, difficulties are encountered in preventing blowback of gases since granular solids do not seal pneumatically. Catalytic solids may be prepared by grinding natural or synthetic materials or by precipitating synthetic gels in the form of micro-spheres. In carrying out conversions of either the catalytic or the non-catalytic type, the regenerator as described above may often be employed partly or mainly to supply or extract heat from the circulating solid. For example as applied to Figure 2, crushed shale to be de-oiled may be introduced through feed line 100 into zone 101 where it contacts hot spent shale from standpipe 102, the spent shale being heated by burning residual carbon with air in regenerator 114. In this case and in other cases such as in the treatment of ores where solid feeds are being continuously supplied, solids are withdrawn in fluidized state from a settler, hopper or standpipe through a line (not shown) at the same rate in order to keep a constant inventory. Of course, in exothermic reactions heat may be abstracted by supplying a cooling gas through line 113 to regenerator 114.

Although the present invention has been described with a certain degree of particularity, it is understood that the present disclosure has been made only by way of example and that numerous changes in the details of construction and the combination and arrangement of parts may be resorted to without departing from the spirit and scope of the invention as hereinafter claimed.

The nature and objects of the present invention having thus been set forth and a specific embodiment of the same given, what is claimed as new and useful and desired to be secured by Letters Patent is:

1. In a process for effecting catalytic conversions of a charging stock at conversion temperature with finely-divided solid catalyst wherein said catalyst is contacted with said stock in gaseous phase in a first reaction zone, becomes deactivated, is separated from said charging stock in a separation zone, regenerated in contact with a regeneration gas in a second reaction zone, separated from said regeneration gas and recycled back to said first reaction zone for further contact with charging stock; the improvement which comprises maintaining the solid catalyst, in finely-divided condition, fluidized throughout, first in the gaseous charging stock and then in the regeneration gas in series contact therewith, recycling the catalyst in the process with a minimum expenditure of energy and a minimum resistance to flow by mounting one of said reaction zones at a higher level than said separation zone, maintaining said other reaction zone as an aerated column in communication with said first reaction zone and said separation zone, introducing a first reactant stream at a low point in said higher level zone and removing the stream from the upper part of said zone, separating catalyst from the upflowing stream in said higher level zone, downwardly withdrawing said separated catalyst from said higher level zone into said aerated columnar reaction zone, introducing a second reactant stream into the top of said aerated columnar zone, passing said second reactant stream downwardly concurrently with said catalyst in said columnar zone, utilizing said column as a reaction zone, as a seal between said higher level zone and said separating zone, and for supplying pressure differential for introducing said catalyst into said separating zone, separating catalyst from said second stream in the separation zone and removing said stream from an upper point thereof, downwardly withdrawing catalyst from said lower separation zone and conveying said downwardly withdrawn catalyst by a gaseous stream back to said higher level reaction zone, while producing a density of the fluidized solid at least within the first reaction zone within the range of 25 to 75% of the density of the freely settled solid.

2. In a process for effecting catalytic conversions of a charging stock at conversion temperature with finely-divided solid catalyst wherein said catalyst is contacted with said stock in gaseous phase in a first reaction zone, becomes deactivated, is separated from said gaseous charging stock, regenerated in contact with a regeneration gas in a second reaction zone, separated from said regeneration gas and recycled back to said first reaction zone for further contact with gaseous charging stock; the improvement which comprises maintaining the solid catalyst, in finely-divided condition, fluidized throughout, first in the gaseous charging stock and then in the regeneration gas in series contact therewith, recycling the catalyst in the process with a minimum expenditure of energy and a minimum of resistance to flow by mounting one of said reaction zones at a higher level than said other zone, introducing the catalyst into the top of said higher level zone, introducing a first reactant stream at a high point in the higher level zone, passing said reactant stream and said catalyst concurrently downward through said higher level zone and withdrawing them together from the lower part of said zone, separating catalyst from said reactant stream, downwardly withdrawing said separated catalyst and introducing it into the top of said lower zone, introducing a second reactant stream into the upper portion of said lower zone, passing said second reactant stream and said catalyst concurrently downward through said lower zone and withdrawing them together from the lower part of said zone, separating catalyst from said second reactant stream, downwardly withdrawing the said separated catalyst and conveying said withdrawn catalyst by a gaseous stream back to the top of said higher level zone, while producing a density of a fluidized solid at least within the first reaction zone within the range of 25 to 75% of the density of the freely settled solid.

JOHN C. MUNDAY.

REFERENCES CITED

The following references are of record in the file of this patent:

UNITED STATES PATENTS

| Number | Name | Date |
|---|---|---|
| 2,247,097 | Menshih | June 24, 1941 |
| 2,268,094 | Russell | Dec. 30, 1941 |
| 2,271,148 | Becker et al. | Jan. 27, 1942 |
| 2,289,329 | Prickett | July 7, 1942 |
| 2,303,083 | Kuhl | Nov. 24, 1942 |
| 2,327,175 | Conn | Aug. 17, 1943 |
| 2,337,684 | Scheineman | Dec. 28, 1943 |
| 2,303,717 | Arveson | Dec. 1, 1942 |
| 2,331,433 | Simpson et al. | Oct. 12, 1943 |
| 2,335,488 | Conrad | Nov. 30, 1943 |
| 2,343,780 | Lewis | Mar. 7, 1944 |
| 2,351,314 | Kaufmann et al. | June 13, 1944 |
| 1,473,879 | Rudolf et al. | Nov. 13, 1923 |
| 2,325,516 | Holt et al. | July 27, 1943 |
| 2,358,888 | Thomas | Sept. 26, 1944 |